Oct. 22, 1963 R. H. WITT ETAL 3,107,472
ROTARY MOWER
Filed April 23, 1962 4 Sheets-Sheet 1

INVENTORS
Robert H. Witt and
John D. Clark
Paul O. Pippel
Atty.

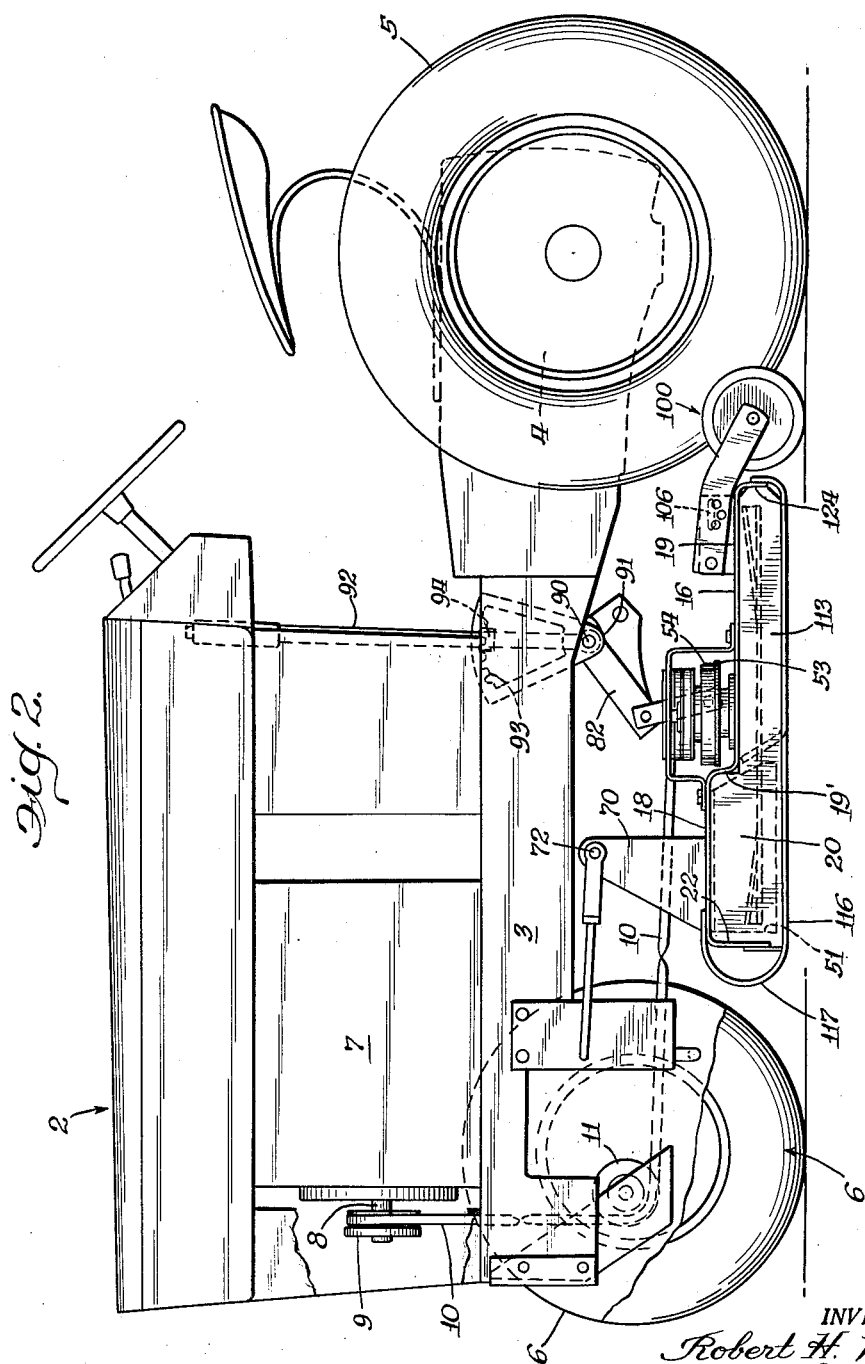

Oct. 22, 1963 R. H. WITT ETAL 3,107,472
ROTARY MOWER
Filed April 23, 1962 4 Sheets-Sheet 3

INVENTORS.
Robert H. Witt and
John D. Clark
Paul O. Puppel
Atty.

Oct. 22, 1963 R. H. WITT ETAL 3,107,472
ROTARY MOWER
Filed April 23, 1962 4 Sheets-Sheet 4
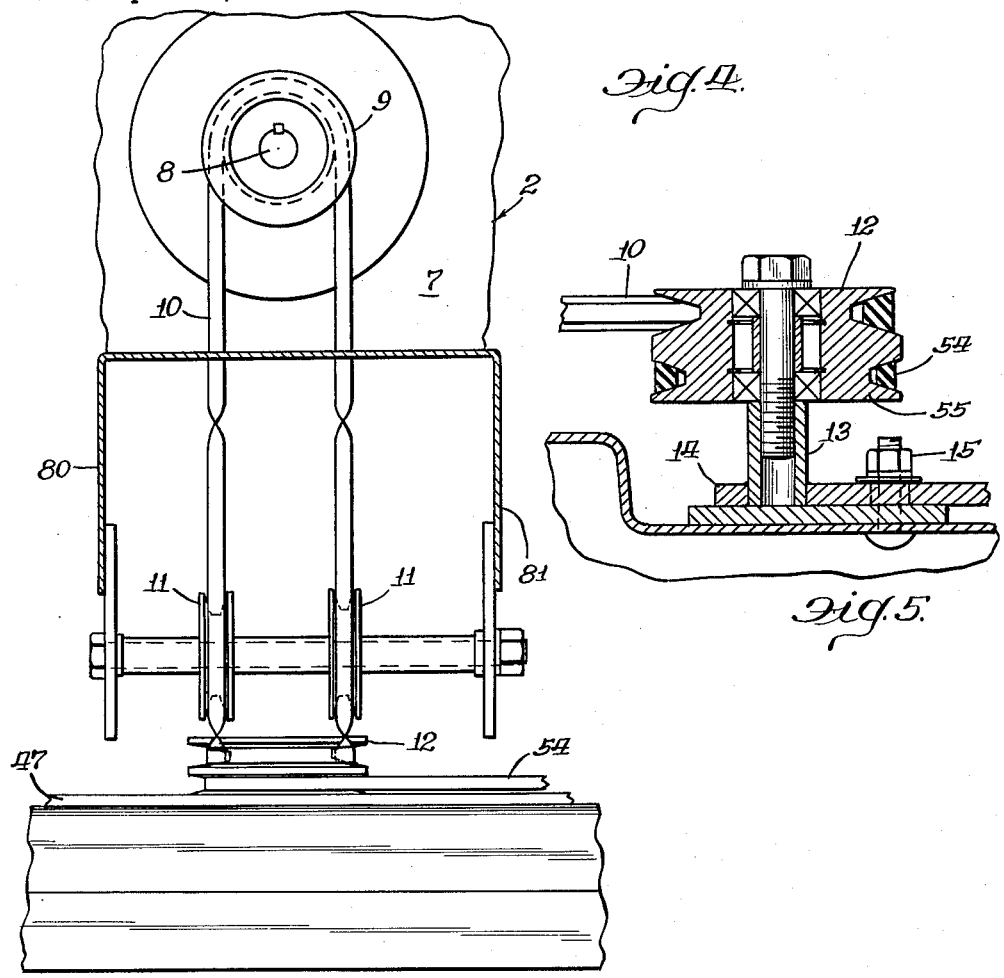
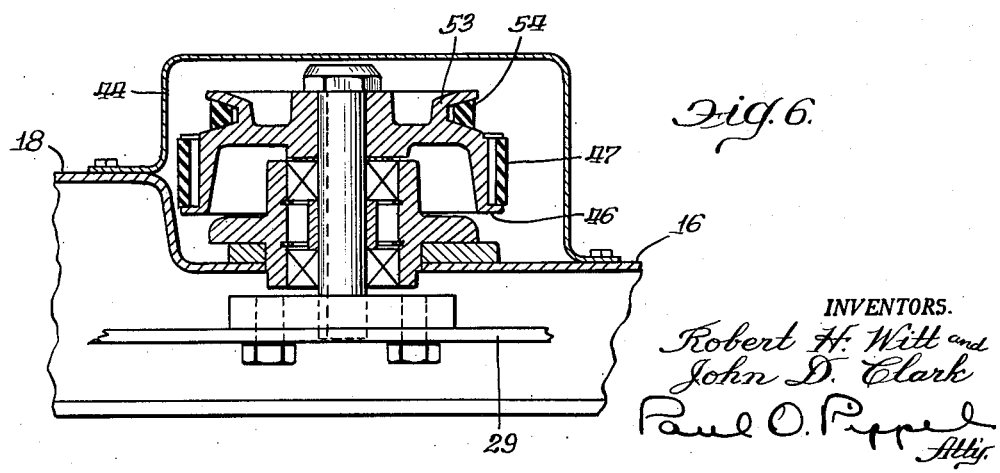
INVENTORS.
Robert H. Witt and
John D. Clark
Paul O. Pippel
Atty.

United States Patent Office 3,107,472
Patented Oct. 22, 1963

3,107,472
ROTARY MOWER
Robert H. Witt and John D. Clark, South Bend, Ind., assignors to International Harvester Company, Chicago, Ill., a corporation of New Jersey
Filed Apr. 23, 1962, Ser. No. 189,389
5 Claims. (Cl. 56—25.4)

This invention relates to rotary mowers.

Rotary mowers in general have one common fault, namely, that they accumulate a considerable amount of the cut material within the housing to such an extent that when operating in dense growth they become clogged and choked and frequently stopped. Furthermore, the problem with the excessive accumulations is that these tend to fall out in big globs and are particularly unsightly and also deteriorate fine lawns. A further objection to rotary mowers is that in general such clippings accumulations tend to decay and are odoriferous particularly when the machine is stored indoors. A further objection to rotary mowers is that they do not spread the cuttings more or less uniformly so that there is excessive windrowing of the material which tends to choke grasses.

A general object of the invention is to provide a novel mower of the so-called rotary type wherein the rotor blades in the housing are so constructed as to provide for good discharge and substantially fine distribution of the cuttings.

A still further object of the invention is to provide a novel mower comprising rotary blade means operating on substantially vertical axes which are encased within a housing and the housing being so constructed as to minimize or substantially eliminate collection of grass cuttings or clippings so that the mower is substantially clean during its operation.

A still further object of the invention is to provide a novel rotary mower which includes a plurality of horizontally operating cutter blades, the housing being compartmented into a front cutting portion and a rear combined blade enclosing and cleaning portion wherein the cutting area has a substantial vertical depth and the trailing area closely confines the blades.

A still further object of the invention is to provide a novel rotary cutter wherein a pair of blades operate on substantially vertical axes, the blades being operating in the same plane but overlapping at adjacent sectors and the blades being so positioned that the cutting sector of the blades is entirely confined to the forward portion of the housing which also serves as a tunnel for discharging the material laterally.

These and other objects and advantages inherent in and encompassed by the invention, will become more readily apparent from the specification and the drawings, wherein:

FIGURE 2 is an enlarged side elevational view of the structure shown in FIGURE 1;

FIGURE 4 is an enlarged front elevational view of a portion of the drive;

FIGURE 5 is an enlarged sectional view taken substantially on the line 5—5 of FIGURE 1;

FIGURE 6 is an enlarged sectional view taken substantially on the line 6—6 of FIGURE 3.

Figure 1:
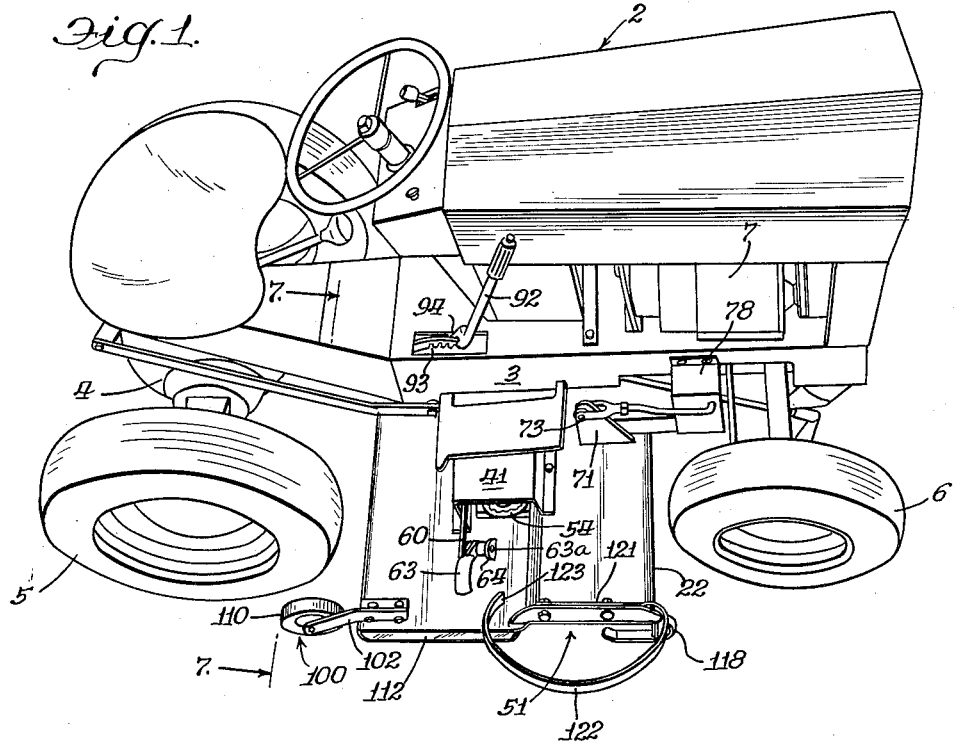
FIGURE 1 is a plan perspective view of the novel mower structure shown in association with a novel tractor.
Figure 7:
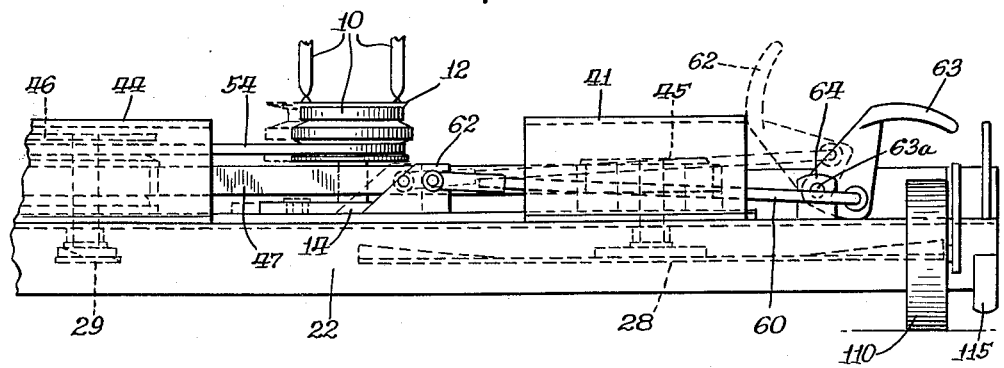
FIGURE 7 is an enlarged view taken substantially on the line 7—7 of FIGURE 1.
Figure 3:
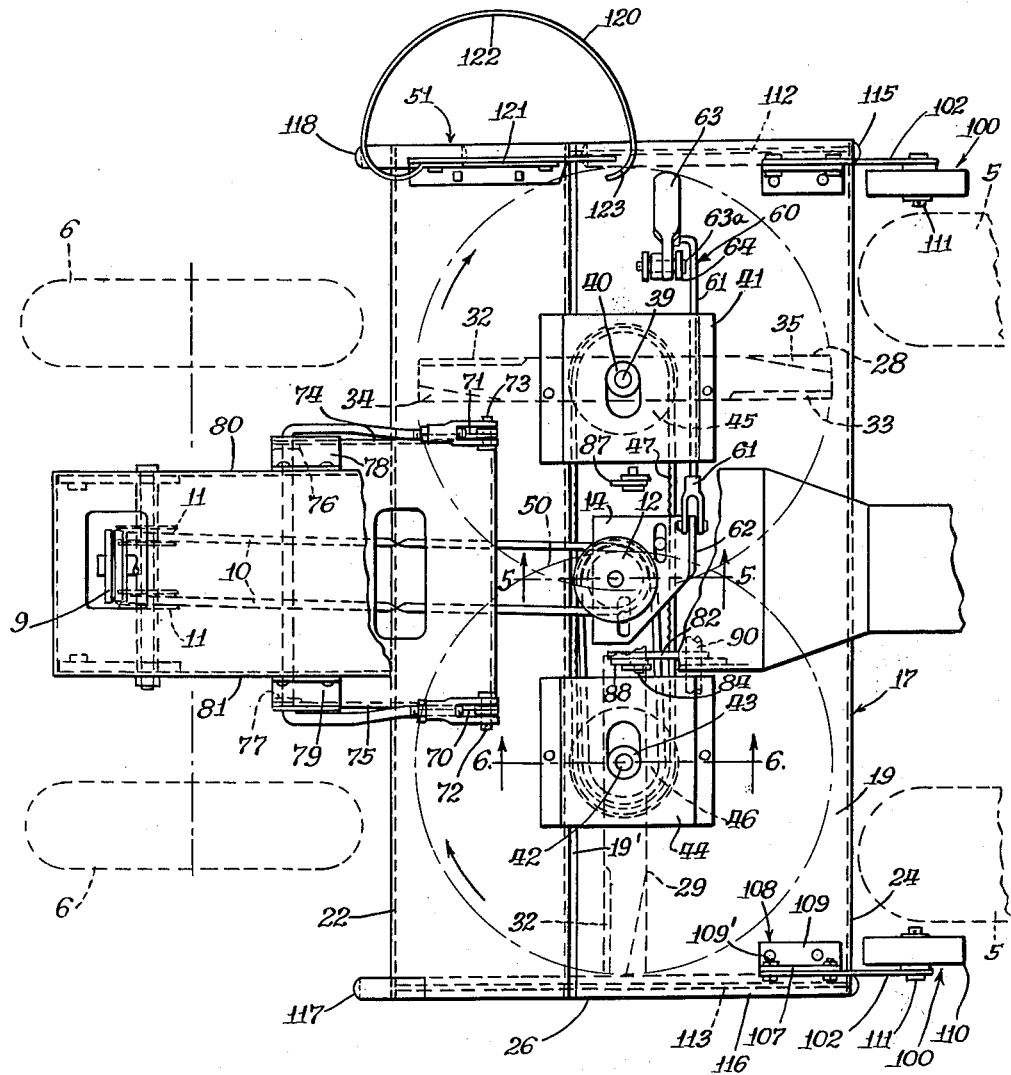
FIGURE 3 is an enlarged plan view of the mower structure.

Describing the invention in detail and showing particular reference to the drawings there is shown a tractor generally designated 2 comprising a longitudinal body 3, a rear axle structure 4 with traction wheels 5. The forward end of the tractor is supported by a front steering truck 6. An engine 7 is mounted on the front of the body 3 and is provided with an output shaft 8 which drives a pulley 9 which drives a belt 10 trained under guide pulleys 11 mounted on the forward end of the tractor, the belt being looped about a central sheave or pulley 12 which is mounted on an upstanding shaft 13 carried by a slide plate 14 which is slidably secured as by bolts 15 to the top housing wall 16 of the mower generally designated 17.

It will be seen that the mower is elongated transversely of the tractor and that its top wall 16 comprises a forward portion 18 and a rear portion 19 and that the forward portion 18 is disposed at considerable elevation above the rear portion 19 and is joined therewith by a substantially S-shaped wall structure 19' which defines the rear terminal edge of the cutting compartment or tunnel 20 of the housing which is substantially rectangular in cross-section and in addition to the top wall portion 18 is defined by a depending forward vertical wall structure 22 which depends downwardly from forward edge of portion 18. It will be seen that the rear wall portion 19 continues to the rear of the unit and terminates in a downwardly projecting rear wall 24 which with the front wall 22 and the right and left edges 25 and 26 of the top wall structure 16 defines a substantially rectangular housing. It will be appreciated that the bottom side of the housing is open and that there are disposed a pair of cutters or blades 28 and 29 each of which is of flat steel bar stock and each blade is presented endwise with respect to its cutting action and has a leading sharpened edge portion 32, 33 at opposite ends and an upturned fan blade 34, 35 behind the edges 32 and 33, respectively. The blade 28 is secured to a mounting block 38 which in turn is fastened to an upstanding shaft 39, the shaft 39 being mounted within a bearing structure 40 which is adjustably supported by means of the plate mounting 41 secured thereto to the top wall of the housing 8. It will be seen that the blade 29 is similarly fastened to a shaft 42 which is mounted in a bearing structure 43 which includes a mounting plate 44 adjustably mounted on the top wall of the housing. The shafts 39 and 42 are provided with toothed pulleys 45 and 46 about which is trained a toothed or cog belt 47 whereby the two blades are synchronized with respect to their overlapped areas of movement which is indicated at 50 to prevent the blades from striking each other since they operate in a common plane. It will be seen that the blades rotate in the directions shown by the arrows and that they assist each other in discharging the material rightwardly or through the discharge opening 51 at the right end of the tunnel portion 20. The shaft 42 is provided with an additional pulley 53 which is driven by a belt 54 which is driven from a pulley 55 which is connected to the pulley 12.

It will be seen that in order to clutch the drive, the pulley assembly 12, 55 is pulled to the right by means of the linkage 60 which includes a rod 61 connected at one end as by an ear 62 to the input shaft mounting plate 14, the other end of the rod being connected to an over-center foot pedal lever 63 which is pivotally mounted as at 63a on ears 64 which are connected to the top wall of the housing. It will be seen that by lowering the over-center lever the belt 54 will be tightened and by raising the lever the belt will be loosened.

The top of the housing at its portion 18 is provided with a pair of laterally spaced upstanding ears 70, 71 which at their upper ends are pivotally connected as at 72 and 73 to the rear ends of arms 74 and 75. The arms 74 and 75 are pivoted coaxially at their forward ends as at 76 and 77 to brackets 78 and 79 which are secured to opposite sides 80 and 81 of the body portion of the tractor. This linkage regulates the vertical movement of the mower as it is raised and lowered by means of the pair of rearwardly extending links 82 and 83 which at their forward ends are pivotally connected as at 84 and 85 coaxially on an axis generally parallel to the axis of the connections 76, 77, to upstanding ears 87 and 88 which are secured to the top wall portion 19 of the housing of the mower. The link members 82 and 83 are interconnected by a shaft 90 which is journalled in ears 91 depending from the underside of the body portion 3 of the tractor. One end of the shaft 90 is connected to a lever 92 which cooperates with a detent 93 which is mounted on the side of the tractor. The lever 92 and latch 94 thereof lock the mower in various positions of elevation with respect to the ground.

At each end of the mower there is provided an adjusting or gauge wheel means 100 which includes a rearwardly projecting arm 102 which extends beyond the rear edge of the housing inwardly of the respective side of the housing. The arm 102 has a downwardly and rearwardly extending rear portion and a substantially horizontal forwardly extending portion and the forward portion is provided adjacent to its rear end with a plurality of pivot openings 104 through which extends a bolt and nut assembly 105 which projects through an elongated slot 106 in an upstanding flange 107 of the bracket 108 which has a bottom flange 109 secured to the top wall of the housing. The arm 102 has a forward opening 106' with a bolt 109' therethrough which extends through an arcuate slot whereupon the arm 102 may be swung downwardly with its rear end or upwardly attendant to the bolt 109' riding in the slot. After proper height adjustment is accomplished dependent on the position of the wheel 110 which is rotatably mounted as at 111 to the rear end of the arm 102, the bolt 109 is tightened to hold the adjustment.

It will be seen that opposite ends of the mower housing are provided with vertical sidewalls 112 and 113 and the sidewalls are preferably weld-connected to runners 115 and 116 respectively which provide forwardly curving bumpers 117 and 118. There is also provided a foot guard and stone deflector 120 above the exit opening 51. This guard comprises a strap which is somewhat C-shaped in plan having one end connected as by bracket assembly 121 to the top wall of the housing adjacent to the discharge opening and the strap curving forwardly and then outwardly and rearwardly and having its intermediate portion 122 opposite the opening and its rear portion 123 hanging over the housing.

This member 120 functions to prevent the accidental placement of the operator's hands or feet into the mower and at the same time if any large particle should be thrown in an upward direction it would have a tendency to deflect the same.

Having described the invention in detail it will be understood that various forms of the invention will become readily apparent to those skilled in the art within the scope of the appended claims.

What is claimed is:

1. In a mower, a housing having a top including stepped generally horizontal front and rear wall portions and an intermediate upright wall portion and peripheral walls defining front and rear chambers, a plurality of laterally spaced moved blades journalled for rotation on vertical axes to the housing, said blades projecting forwardly into the front chamber and having a path of movement providing a cutting sector wholly confined in the front chamber, said front chamber defining a laterally extending clipping discharge tunnel of substantial depth above the blades, said intermediate wall having a lower edge disposed in close proximity to the blades and said rear wall portion generally paralleling said blades and disposed in clearing proximity thereto.

2. The invention according to claim 1 and the axes of rotation of the blades being disposed immediately rearwardly of the intervening upright wall portion.

3. The invention according to claim 1, and said housing having a discharge opening in a peripheral wall thereof in alignment with the tunnel.

4. A mower having a generally rectangular housing with a deep longitudinal front tunnel portion and a shallow blade-confining rear portion and a plurality of horizontally overlapped blades rotatable on axes adjacent to the front portion and having cutting sectors located wholly within the tunnel portion.

5. The invention according to claim 4 and said housing having a discharge at one end of the tunnel and a curved deflector and guard on the housing bowed forwardly and outwardly and rearwardly and overlapping the tunnel discharge area.

References Cited in the file of this patent

UNITED STATES PATENTS

| | | |
|---|---|---|
| 2,928,223 | Danuser | Mar. 15, 1960 |
| 2,949,004 | Jones | Aug. 16, 1960 |
| 2,972,850 | Ariens et al. | Feb. 28, 1961 |
| 3,040,502 | Smith et al. | June 26, 1962 |
| 3,041,810 | Roberts et al. | July 3, 1962 |